Sept. 5, 1950 M. T. FORKER, JR 2,521,001
COMBINATION SLEEVE AND BALL JOINT
Filed Jan. 31, 1948

INVENTOR.
Major T. Forker Jr.
BY
ATTORNEYS.

Patented Sept. 5, 1950

2,521,001

UNITED STATES PATENT OFFICE 2,521,001

COMBINATION SLEEVE AND BALL JOINT

Major Torbett Forker, Jr., New York, N. Y., assignor to Franklin Railway Supply Company, a corporation of Delaware Application January 31, 1948, Serial No. 5,585

5 Claims. (Cl. 285—94)

This invention relates to flexible pipe joints adapted for use in situations where the connected pipes are subject to relative motion in different senses, for instance to swiveling motion and also to rocking motion.

In an ordinary ball or spherical joint, the spherical surfaces are relied upon not only for rocking motion but also for swiveling motion, and in consequence the spherical surfaces are subjected to all of the wear incident to both types of motions. Such joints, therefore, wear "out-of-round" rather quickly, and this gives rise to necessity for frequent repairs, repacking, etc., and is also disadvantageous because refinishing or replacement of spherically curved surfaces is a relatively expensive matter.

According to the present invention, a joint is provided incorporating both cylindrical and spherical bearing surfaces, the parts of the joint being arranged so that swiveling motion is accommodated by the cylindrical surfaces, and rocking motions are accommodated by the spherical surfaces. In this way, wear on the spherical surfaces is greatly reduced.

The foregoing is accomplished by the invention by employment of a joint of exceedingly simple construction, the number of parts in the joint being few and also being readily fabricated.

Figure 2:
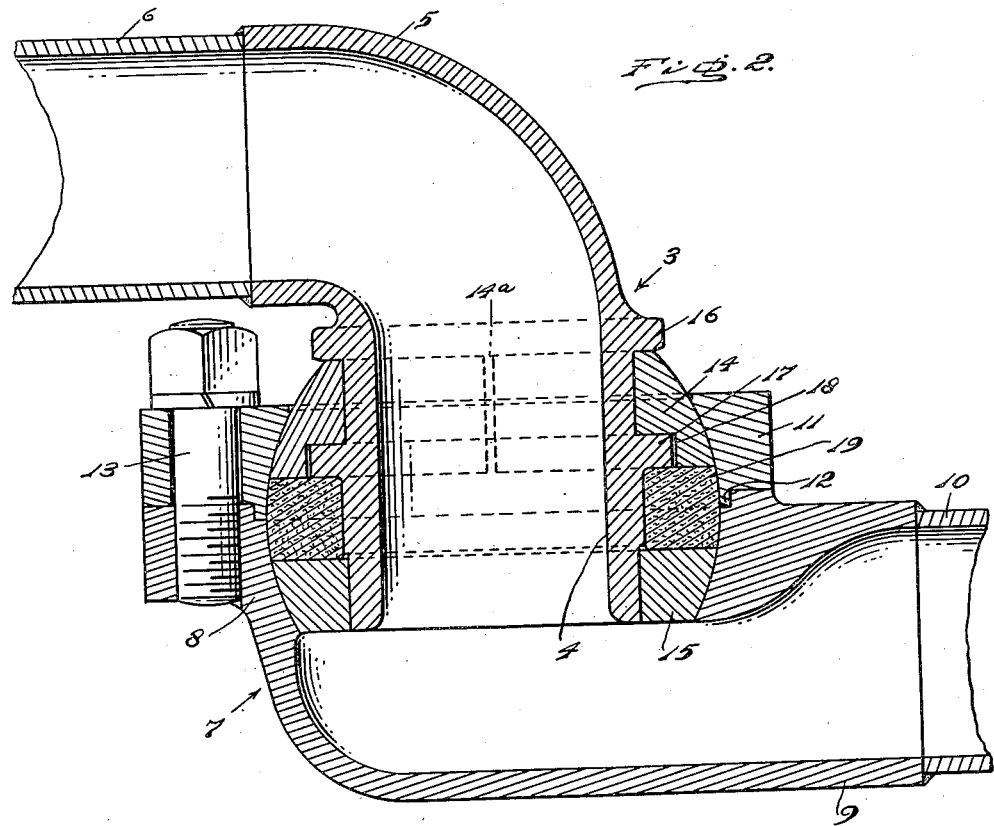
Figure 1:
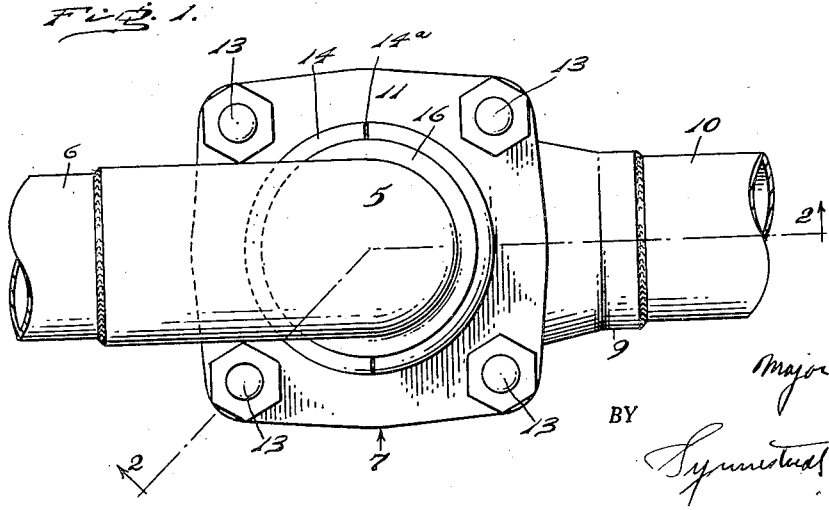

The manner in which the foregoing objects and advantages are attained will appear more fully from the following description referring to the accompanying drawing, in which:

Figure 1 is a plan view of a flexible pipe joint constructed according to the present invention; and Figure 2 is an enlarged axial sectional view through the joint, this view being taken substantially as indicated by the section line 2—2 on Figure 1, but showing one of the connected pipes swiveled to a different angular position from that appearing in Figure 1.

The joint includes an internal joint member generally indicated by the numeral 3, this member comprising a sleeve-like portion 4 and an elbow 5 with which one of the pipes to be connected is adapted to be secured, as indicated at 6. The joint also includes an external member generally indicated at 7 having a socket portion 8 surrounding the sleeve 4 of the internal member and also having an elbow 9 for cooperation with the other one of the pipes to be connected, as indicated at 10. The socket portion of the external joint member is, in reality, formed of two parts, i. e., part 8 just mentioned and a separable ring 11. The part 8 and the ring 11 are complementarily shouldered as indicated at 12 to provide proper interpositioning of these parts and to present a continuous internal spherical joint surface as shown. The separable ring 11 is secured to the body of the external joint member by means of four studs 13.

A pair of bearing rings 14 and 15 are interposed between the internal and external joint members, each of these bearing rings having an internal cylindrical surface adapted to cooperate with the sleeve 4 and an external spherical surface adapted to cooperate with the spherical surfacing of the socket 8—11 of the external joint member. Ring 14 is of split construction, for instance of two-part construction, a break in this ring being indicated at 14a and the parts of this ring are received between a pair of spaced annular abutments 16 and 17. The parts of ring 14 are also recessed or shouldered as indicated at 18 to accommodate the abutment 17.

Ring 15 is axially movable on the sleeve 4 and a packing ring 19 is interposed between rings 14 and 15, and a portion of the packing ring also lying adjacent the undersurface of the annular abutment 17.

It is contemplated according to the invention that the packing ring 19 be formed of somewhat resilient material or be of somewhat resilient construction, so that upon tightening the studs 13 the packing ring is placed under compression between the bearing rings 14 and 15. This results in snug engagement of the packing ring with the sleeve 4 and the spherical surface of the socket of the external joint member. Such a packing ring may be made in various ways and of a variety of materials, for instance of graphited woven asbestos fibre, or a molded composition.

With the arrangement described, the packing ring itself serves as a means for maintaining the spherical surfaces of the bearing rings in engagement with the spherical surfacing of the socket. It is also pointed out that in the arrangement described the axial positioning of the ring 14 by the annular abutments 16 and 17 results also in axial positioning of the entire external joint member with relation to the internal joint member.

In the preferred arrangement of the joint the annular abutment 16 is of sufficiently large external diameter to project somewhat beyond the external spherical surface of the ring 14, whereby this abutment not only serves to position the ring 14 but also acts as a stop for limiting rocking movement of the joint members.

From the foregoing it will be seen that the joint of the present invention is of exceedingly simple construction. The joint, moreover, is capable of ready assembly and may easily be taken apart for repacking or repair. In assembling the joint the separable ring 11 is first slid over the free end of the sleeve 4. The rings 14, 15 and 19 are then assembled on the sleeve, after which the socket part 8 of the external joint member is brought into position and the ring 11 fastened in place by means of the studs 13.

Since the cylindrical surfaces of the joint are of smaller diameter than the spherical surfaces, swiveling type motions of the connected pipes tend to take place on the cylindrical surfaces of the sleeve 4 and the bearing rings 14 and 15, and in this way the spherical surfaces between the external joint member and the bearing rings 14 and 15 are relieved of wear incident to swiveling motions. At the same time, however, the joint also provides freedom for rocking type of motions which, of course, take place at the complementary spherical surfacing of the external joint member and of the bearing rings.

I claim:

1. A flexible pipe joint comprising an internal member of generally cylindrical external shape, an external member of generally spherical internal shape and bearing rings between said members having internal cylindrical surfaces mating with complementary surfaces on the internal joint member and external spherical surfaces mating with complementary surfaces on the external joint member, the internal member having axially spaced externally projecting abutments adapted to engage one of the bearing rings to axially position said ring and thereby also axially position the external joint member with respect to the internal joint member.

2. A flexible pipe joint comprising an internal member of generally cylindrical external shape, an external member of generally spherical internal shape, a pair of axially spaced bearing rings between said members having internal cylindrical surfaces mating with complementary surfaces on the internal joint member and external spherical surfaces mating with complementary surfaces on the external joint member, a packing ring between said bearing rings adapted to engage the internal and external joint members, the internal joint member having axially spaced externally projecting abutments adapted to engage one of the bearing rings to axially position said ring, and the other ring being axially movable with respect to the internal member, and means associated with the external joint member for drawing the bearing rings toward each other against the packing ring therebetween to thereby tighten the engagement of the packing ring with the internal and external joint members.

3. A flexible pipe joint comprising an internal member of generally cylindrical external shape, an external member of generally spherical internal shape a pair of axially spaced bearing rings between said members having internal cylindrical surfaces mating with complementary surfaces on the internal joint member and external spherical surfaces mating with complementary surfaces on the external joint member, a packing ring between said bearing rings adapted to engage the internal and external joint members, the internal joint member having axially spaced externally projecting abutments adapted to engage one of the bearing rings to axially position said ring, and the other ring being axially movable with respect to the internal member to provide for tightening of the packing ring therebetween, the external joint member being of multipart construction, being split in a plane substantially perpendicular to the axis of the internal joint member between the plane of said bearing rings to provide for tightening of the packing ring between the bearing rings when the parts of the external joint member are brought together upon assembly.

4. A construction according to claim 3 in which one of the abutments on the internal joint member comprises an annular member lying adjacent the packing ring and in which the bearing ring engaged between said abutments is internally shouldered to an axial extent accommodating said annular abutment to provide for engagement of said shouldered ring with the packing ring.

5. A construction according to claim 3 in which one of the abutments on the internal joint member comprises an annular member projecting radially beyond the spherical surface of the adjacent bearing ring and serving to limit angular movement of the joint members on the complementary spherical surfaces of the external joint member and the bearing rings.

MAJOR TORBETT FORKER, Jr.

REFERENCES CITED

The following references are of record in the file of this patent:

UNITED STATES PATENTS

| Number | Name | Date |
| --- | --- | --- |
| 381,826 | Brickerhoff | Apr. 24, 1888 |
| 1,434,631 | Reynolds | Nov. 7, 1922 |
| 1,597,669 | Brownell | Aug. 31, 1926 |
| 2,085,922 | Moore | July 6, 1937 |

FOREIGN PATENTS

| Number | Country | Date |
| --- | --- | --- |
| 177,494 | Canada | June 5, 1917 |